US011691893B2

(12) United States Patent
Chai et al.

(10) Patent No.: US 11,691,893 B2
(45) Date of Patent: Jul. 4, 2023

(54) METHOD FOR DIRECTLY AND DEEPLY PURIFYING HIGH CONCENTRATION ORGANIC WASTEWATER

(71) Applicant: JIANGXI GAIA ENVIRONMENTAL SCIENCE AND TECHNOLOGY CO., LTD., Jiangxi (CN)

(72) Inventors: Xilin Chai, Jiangxi (CN); Shijun Wang, Jiangxi (CN)

(73) Assignee: JIANGXI GAIA ENVIRONMENTAL SCIENCE AND TECHNOLOGY CO., LTD., Jiangxi (CN)

( * ) Notice: Subject to any disclaimer, the term of this patent is extended or adjusted under 35 U.S.C. 154(b) by 1047 days.

(21) Appl. No.: 16/346,540

(22) PCT Filed: Mar. 17, 2017

(86) PCT No.: PCT/CN2017/077045
§ 371 (c)(1),
(2) Date: May 1, 2019

(87) PCT Pub. No.: WO2018/082235
PCT Pub. Date: May 11, 2018

(65) Prior Publication Data
US 2020/0055740 A1 Feb. 20, 2020

(30) Foreign Application Priority Data
Nov. 7, 2016 (CN) .......................... 201610976118.7

(51) Int. Cl.
C02F 1/00 (2023.01)
C02F 1/52 (2023.01)
(Continued)

(52) U.S. Cl.
CPC ............ *C02F 1/001* (2013.01); *C02F 1/5236* (2013.01); *C02F 1/56* (2013.01); *C02F 1/66* (2013.01);
(Continued)

(58) Field of Classification Search
None
See application file for complete search history.

(56) References Cited

U.S. PATENT DOCUMENTS 5,863,433 A * 1/1999 Behrends ................ C02F 3/327
210/150
2007/0221552 A1* 9/2007 Denney .................. B01D 21/30
210/85

OTHER PUBLICATIONS

"Machine Translation of CN 101708917", Gong et al., published 2010, 32 total pages (Year: 2010).*
(Continued)

Primary Examiner — Jonathan M Peo

(57) ABSTRACT

A method for directly and deeply purifying high concentration organic wastewater, specifically includes the following steps of: (1) fortified precipitation treatment; (2) rapid filtration of sediment of suspended solids; (3) pH value adjustment; (4) hydrolysis acidification where pH value adjusted waste water enters a water distribution unit in which a biological hanging film filter is arranged to fortify an anaerobic hydrolysis acidification function of the waste water; and (5) bio-filter treatment. A rapid and low cost treatment method for high concentration, high ammonia and high nitrogen organic waste water is provided by means of water and air distribution by the biological filtering bed, an air-water backwashing bed layer structure, setting of a temperature regulation system for the biological filtering bed, and a combined process of the biological filtering bed with a fortified sedimentation unit, a suspension object sediment rapid filtration unit, and like unit structures.

9 Claims, 2 Drawing Sheets

Layers structure of the bio-filter

(51) Int. Cl.
*C02F 1/56* (2023.01)
*C02F 1/66* (2023.01)
*C02F 3/30* (2023.01)
*C02F 9/00* (2023.01)

(52) U.S. Cl.
CPC .................. *C02F 3/30* (2013.01); *C02F 9/00* (2013.01); *C02F 2001/007* (2013.01); *C02F 2301/04* (2013.01); *C02F 2301/10* (2013.01)

(56) References Cited

OTHER PUBLICATIONS

"Machine Translation of CN 102145968", Hu et al., published 2011, 12 total pages (Year: 2011).*
"Machine Translation of CN 106007002", Chai et al., published 2016, 13 total pages (Year: 2016).*

* cited by examiner

METHOD FOR DIRECTLY AND DEEPLY PURIFYING HIGH CONCENTRATION ORGANIC WASTEWATER

CROSS REFERENCE OF RELATED APPLICATION

This is a U.S. National Stage under 35 U.S.C 371 of the International Application PCT/CN2017/077045, filed Mar. 17, 2017, which claims priority under 35 U.S.C. 119(a-d) to, a Chinese patent with an application number of CN201610976118.7 and a publication number of CN106316004A, filed Jan. 11, 2017.

BACKGROUND OF THE PRESENT INVENTION

Field of Invention

The present invention relates to the technical field of the ecological environmental protection technology, and more particularly to a method for directly and deeply purifying high concentration organic wastewater.

Description of Related Arts

High-concentration organic wastewater generally refers to wastewater discharged from livestock and poultry farming, landfill leachate, papermaking, leather and food industries with a COD concentration of 2000 mg/l or more, or even tens or hundreds of thousands, and an ammonia nitrogen concentration of 1000 mg/l or more. These wastewaters contain a large amount of organic matter such as carbohydrates, fats, proteins, and cellulose. The composition is complex. Most of the organic compounds are aromatic and heterocyclic compounds, and sulfides, nitrides, heavy metals and organic toxicants are mostly contained. The waste water has extremely high chromaticity, has a bad odor, and is pungent and odorous. If directly discharged, the wastewater will have a huge impact on the surrounding environments. According to the different processing principles, the treatment manners can be divided into three major treatment methods: a physical chemical treatment method, a biological treatment method and a catalytic oxidation treatment method. The physicochemical treatment method may specifically employ a photochemical coagulation method, an oxidative adsorption method, an incineration method, a Fenton oxidation method, an ozone oxidation method, or the like. The biological treatment method can specifically adopt an aerobic activated sludge method, an aerobic bio-film method, and an anaerobic biological treatment method.

However, the technical bottleneck of high-concentration organic wastewater treatment technology still exists, and some problems such as high energy consumption, unstable treatment effect, complicated operation, and serious temperature influence all restrict the environmental protection development of enterprises. Especially in the trend of agricultural pollution surpassing industrial pollution, it further embodies the importance of low-cost, high-efficiency pollution control technology. For example, livestock and poultry farming wastewater pollution, which accounts for more than 80% of agricultural pollution sources, is typical of high COD and high ammonia nitrogen organic wastewater pollution. However, it is obviously inappropriate to use industrial pollution control methods in this low value-added agricultural economic entity. A technique that combines physical and chemical processing methods, which can achieve both processing standards and low-cost stable operation, is a technical problem that those skilled in the art need to solve.

SUMMARY OF THE PRESENT INVENTION

In view of the above deficiencies, a technical problem to be solved by the present invention is to provide a technology combining physical and chemical methods with biological treatment methods, which can not only achieve processing standards but also operate stably at low cost.

In view of the objects mentioned above, the present invention is achieved by the following technical solutions.

A method for directly and deeply purifying high concentration organic wastewater, specifically comprises steps of:

(1) fortified precipitation treatment: sending high-concentration organic wastewater to an enhanced precipitation unit for pretreatment, wherein the enhanced precipitation unit comprises a dosing and coagulation unit, a dosing and flocculation unit and a physical precipitation unit;

(2) rapid filtration of sediment of suspended solids: passing the wastewater treated by the enhanced precipitation unit through a sediment of suspended solids filtration unit, wherein a filter material of the sediment of the suspended solids filtration unit is selected from gravel and/or river sand, and particle size distribution of the filter bed comprises: 2-4 cm of a surface layer, 1-2 cm of a middle and upper layer, and 0.5-1 cm of a lower layer;

(3) pH adjustment: performing alkalinity adjusting pretreatment on the wastewater after the rapid filtration of the sediment of the suspended solids in the step (2) and adjusting a pH value of the wastewater to a range of 7.5-10.5;

(4) hydrolysis acidification: introducing the wastewater after adjusting the pH value into a water distribution unit, and a biological membrane packing is provided in the water distribution unit to strengthen anaerobic hydrolysis acidification effects of the wastewater;

(5) bio-filter treatment: distributing the wastewater into a bio-filter unit by the water distribution unit, so as to achieve directly deep treatment of the wastewater by strong organic matter degradation ability of biological filler.

Preferably, the biological filler is a multi-biological phase microorganism micelle filler. The multi-biological microbial cellulite filler is a filler which is organically grown under a certain environment for a long time under aerobic, anaerobic and anaerobic conditions. After many years of physical, chemical and biodegradation, the final properties and a class of soily loose materials with relatively stable components. The microbial micelle is rich in microorganisms, and the variety is numerous. The appearance has the characteristics of multi-phase porosity and large surface area, and has the advantages of high nutrient content. Through the analysis of physical and chemical properties of bacteria micelles, a result shows that bacteria micelles have excellent purification performance of pollutants which is difficult to form under natural conditions, and is an excellent biological treatment medium for wastewater.

Preferably, when a concentration of the suspended solids in the wastewater is not high, and enhanced removal is not needed, the step (1) of fortified precipitation treatment is omitted, and the wastewater is directly performed with the step (2) of the rapid filtration of the sediment of the suspended solids.

Preferably, a temperature adjustment control system is provided on the bio-filter, the temperature adjustment control system comprises a heating system, an insulated filter wall, and a temperature sensing control system, wherein the heating system is connected with a fan outlet pipe, and after heating air, a hot air is introduced into the bio-filter; wherein heating system comprises an insulated aluminum shell, heat insulating cotton, a steel pipe and a heating pipe from outside to inside; the heating pipe is far infrared radiation heating lamp and/or PTC ceramic heating element Preferably, the temperature sensing control system comprises a temperature sensor, the temperature sensor is configured to transmit a signal to PLC, the PLC is configured to control opening and stopping of heating pipes according to temperature conditions, when a temperature is at 5-10° C., open one group of the heating pipes; when the temperature is at 0-5° C., open two groups of the heating pipes; when the temperature is at −5-0° C., open three groups of the heating pipes, which is increased in sequence.

Preferably, in the step (5), a height of the bio-filter adopted in the step (5) is at a range of 2.0 to 3.5 meters, and is divided into 5 to 10 layers from top to bottom, preferably 6-8 layers, comprising: a top water distribution layer, a secondary water distribution layer, and an intermittent water distribution layer, a gas-water backwashing layer, a bottom water collecting layer, and a blind drain sewage layer; the top cloth water layer is provided overheadly with an atomizing water distributor, and an atomizing nozzle is provided on the atomizing water distributor; a distance between the secondary water distribution layer and a top of the bio-filter is at a range of 15-25 cm; and a diameter of a water distribution pipe of the secondary water distribution layer is ½ of a diameter of a water distribution pipe of the top water distribution layer; the gas-water backwashing layer comprises 5 layers, wherein each layer of the 5 layers is 0.1 m; and backwashing water pipes and backwashing gas pipes are staggered inside the gas-water backwashing layer; medium and coarse sand is provided between each adjacent layers of the 5 layers for serving as partition layers; the bottom water collecting layer is made of plastic blind ditch, perforated PVC water pipe or perforated PE water pipe, which are provided in a branch shape Preferably, the gas-water backwashing layer adopts a flushing mode of 8 to 12 cycles per day, each of the cycles is 2 to 3 hours, high pressure compressed air is washed for 20 to 40 minutes, a flushing pressure is 1 to 2 kilograms, and air washing is delayed for 10 minutes, and then wash by water for 8-12 cycles per day, 2-3 hours per cycle, rinsed for 20-40 min, wherein a rinse pressure is at a range of 0.05-0.1 kg Preferably, a coagulant adopted in the dosing and coagulation unit in the step (1) comprises: polyaluminum chloride or polyferric ferrous sulfate; a flocculating agent adopted in the dosing and flocculation unit comprises cationic polyacrylamide, anionic polyacrylamide or nonionic polyacrylamide.

Preferably, the dosing and flocculation unit specifically adopts a baffle flocculation tank, a flocculation time is at a range of 20-30 min, and a flow velocity of the baffle flocculation tank is designed according to a gradient from large to small, and a starting flow velocity is at a range of 0.5-0.6 m/s, and an end flow velocity is at a range of 0.2-0.3 m/s, a clearance between partitions is greater than 0.5-1 m.

Preferably, the dosing and flocculation unit specifically adopts a mechanical flocculation tank, and a flocculation time is generally selected from 15 to 20 min; the tank is provided with a 3 to 4 gear mixer; a line speed of the mixer gradually decreases from 0.5 m/s in a first gear to 0.2 m/s in a last gear; facilities for preventing short-flowing in water are provided in the tank.

Preferably, the granulating and flocculation unit adopts a folding plate flocculation tank, and a flocculation time is at a range of 12-20 min; a speed in a flocculation process is divided into 3-8 sections, and a flow velocity of each section is: 0.25-0.35 m/s in a first section, 0.15-0.25 m/s in a second section, 0.10-0.15 m/s in a third section, and a flow velocity of each subsequent section is gradually slowed down; an angle of a folded plate is at a range of 90°-120°.

Preferably, the granule and flocculation unit specifically adopts a grid flocculation tank, wherein the grid flocculation tank is a multi-grid vertical flow flocculation tank, and the flocculation tank is arranged in two or more groups in a parallel form, and a mud discharging facility in provided in the tank; a flocculation time is at a range of 12-20 min; a flow velocity of a vertical shaft over-gate flow velocity and a hole passing flow velocity of the flocculation tank are divided into three sections, which are decremented step by step, respectively comprising: a shaft flow velocity of 0.14-0.12 m/s in a front section and a middle section, and 0.14-0.10 m/s in a last section; over-gate flow velocity of 0.30-0.25 m/s in the front section, 0.25-0.22 m/s in the middle section, and 0.22-0.100 m/s in a last section; a flow velocity between vertical shafts of 0.30-0.20 m/s in the front section, 0.20-0.15 m/s in the middle section 0.14-0.10 m/s in a last section.

Preferably, after being treated by the bio-filter, an intermediate water temporary storage unit and a water quality strengthening unit are further provided; wherein the water quality strengthening unit is at least one member selected from a group consisting of a horizontal submerged artificial wetland, a vertical flow artificial wetland, a surface flow artificial wetland, an upward flow filter and a downward flow filter; the water quality strengthening unit has a filler of gravel or medium coarse sand with a diameter at a range of 0.5-4 cm; a carbon source of the water quality strengthening unit is at least a member selected from the group consisting of chaff, straw end, sawdust, starch ash, glucose and methanol.

The beneficial effects of the present invention are as follows.

(1) The purpose of directly and deeply treating high-concentration organic wastewater is achieved by high-efficiency, rapid and low-cost by the arrangement of water distribution, gas distribution, gas-water backwashing bed construction and biological filter temperature control system of the bio-filter bed, and completely solve the technical problems of traditional bio-filter blockage and temperature limitation.

(2) The sewage treatment facilities of the bio-filter structure in the conventional art have always had the following problems: a. uneven distribution of water, excessive local load, causing clogging, and even affecting the quality of the effluent; b. single layer structure, no obvious functional bio-filter division, which cannot achieve the identical reactor simultaneous degradation of organic matter, nitrification and denitrification of ammonia nitrogen; c. long-term operation, microbial doubling and sludge aging biofilm shedding will gradually reduce the porosity, or even blockage, Unable to produce water normally. The bio-filter of the present application is generally divided into 5-10 layers from top to bottom, and main functional areas comprise: water distribution layer, gas distribution layer, gas-water backwashing layer, water collecting layer and blind ditch sewage layer, which are operated intermittently, thoroughly solve the problems above of the bio-filter in the conventional art.

(3) According to the present invention, the corresponding pretreatment process is selected according to the water quality of different waste waters, and then combined with the boil-filter after the pretreatment, the present invention carries out the parameter condition design according to the biological characteristics of the microbial cell micelle of the bio-filter, focuses on strengthening functionality of each unit structure, and enables direct deep purification of high-concentration organic wastewater through a combination of processes.

DETAILED DESCRIPTION OF THE PREFERRED EMBODIMENT

Figure 1:
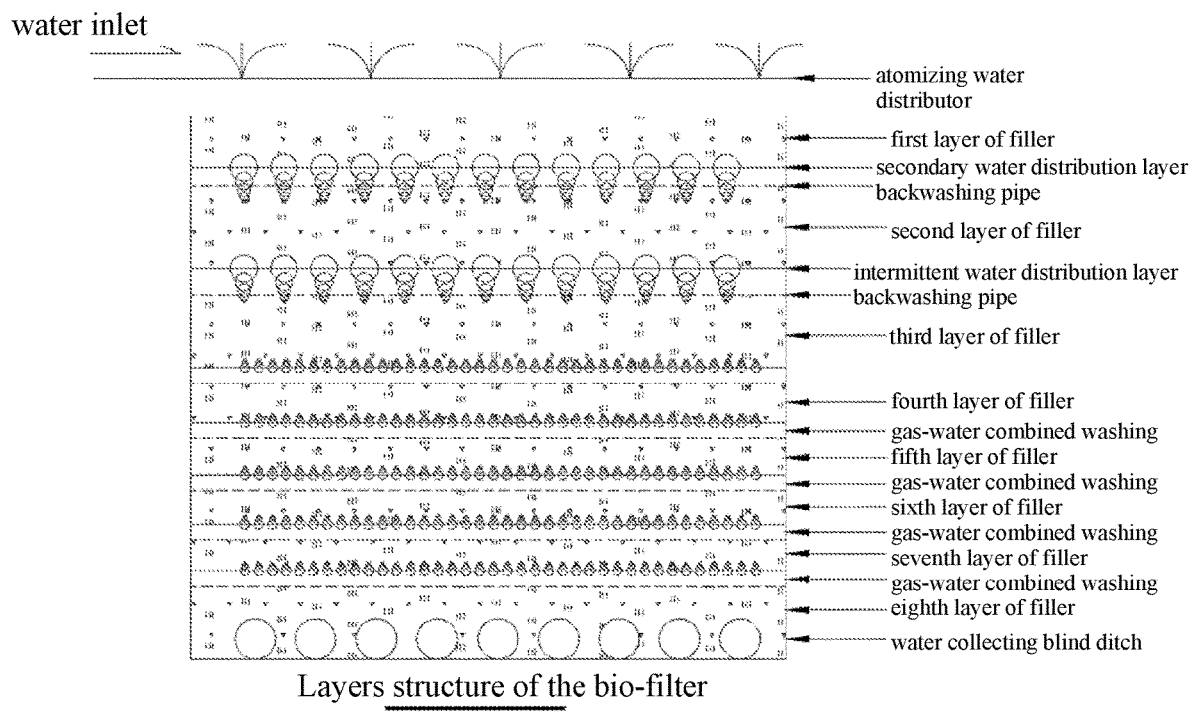
FIG. 1 is a structural diagram of layers of a biological filter bed of the present invention.
Figure 2:
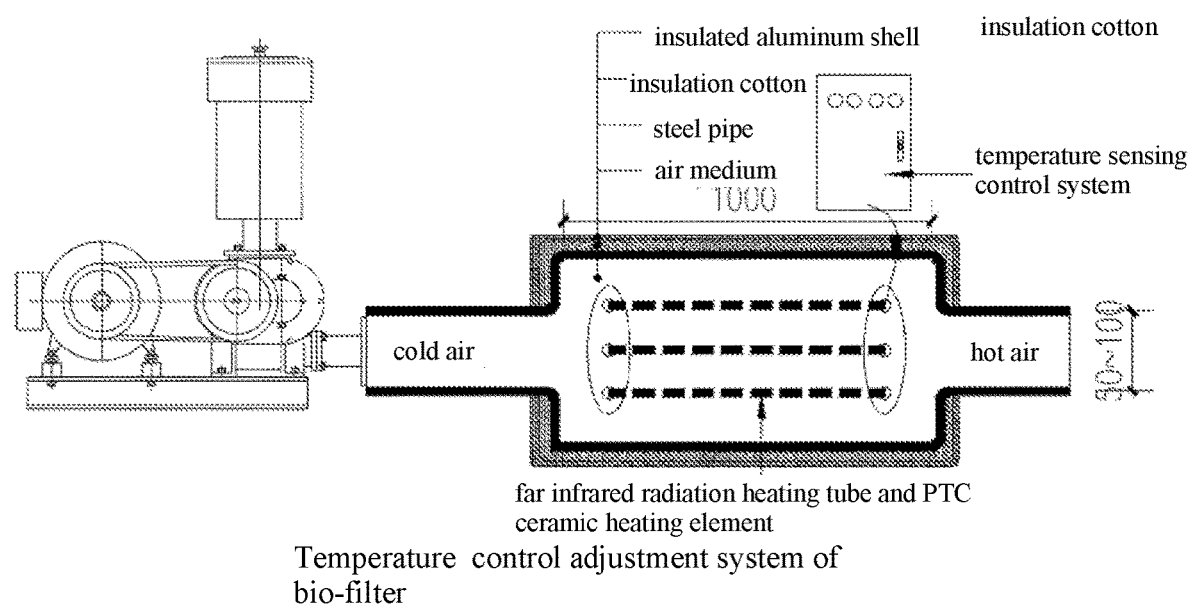
FIG. 2 is a schematic diagram of a bio-filter temperature control adjustment system of the present invention.

A method for directly and deeply purifying high concentration organic wastewater comprises following steps of:

(1) fortified precipitation treatment: comprising:

a medicinal coagulation unit, wherein a coagulant comprises polyaluminum chloride and polyferric sulfate;

a granule flocculating unit, wherein flocculating agent comprises: cationic polyacrylamide, anionic polyacrylamide and nonionic polypropylene amide; and a physical precipitation unit, wherein by chemical double-layer compression, adsorption neutralization, adsorption bridging, sediment network capture and other mechanisms, fine suspended particles and colloidal ions in water are performed with destabilization, aggregation, flocculation, coagulation and sedimentation; wherein the present invention generally selects a baffle flocculation tank, a mechanical flocculation tank, a flap flocculation tank or a grid flocculation tank; wherein:

a. baffle flocculation tank: (a-1) flocculation time is generally 20-30 min; (a-2) a flow velocity of a flocculating tank corridor is designed according to a gradient from large to small, wherein a starting flow rate should be 0.5-0.6 m/s, and an end flow rate should be 0.2-0.3 m/s; a clearance between baffles should be greater than 0.5-1 m;

b. mechanical flocculation tank: wherein (b-1) flocculating time is generally 15-20 min; (b-2) the tank is equipped with 3-4 gear mixer; (b-3) a speed of the mixer should be determined according to a line speed at an edge of a pulp plate, a line speed should be gradually reduced from a first gear of 0.5 m/s to a last gear of 0.2 m/s; ④ facilities for preventing short-flowing of water are provided in the tank;

c. folding flocculation tank: wherein: (b-1) a flocculation time is generally selected 12-20 min; (b-2) a speed of a flocculation process is reduced step by step, a number of segments is 3-8 segments; a flow velocity of each segment can be: a first segment, 0.25~0.35 m/s; a second segment, 0.15-0.25 m/s; a third segment, 0.10-0.15 m/s; wherein a flow rate in subsequent sections is gradually slowed down; (b-3) an angle of a fold plate is 90°-120°; ④ the third section adopts a straight plate;

d. grid flocculation tank: (d-1) flocculation tank is designed into a multi-grid vertical flow type; (d-2) flocculation time is generally 12-20 min; (d-3) flocculation tank vertical shaft flow rate, over-gate (over-net) and via flow rate should be reduced step by step and divided into three sections; wherein flow rate are respectively: average flow rate of the vertical shaft: 0.14-0.12 m/s in front and middle sections, 0.14-0.10 m/s in a last section; a flow rate in the over-gate (over-net): 0.30-0.25 m/s in the front section and 0.25-0.22 m in the middle section; a flow rate of holes between the vertical shafts: 0.30-0.20 m/s in the front section, 0.20-0.15 m/s in the middle section, and 0.14-0.10 m/s in the last section; (d-4) the flocculation tanks is arranged in two or more groups connected in parallel; (d-5) a mud discharge facility is provided in the flocculation tank;

(2) Rapid filtration of sediment in suspended solids: when a concentration of suspended solids in the wastewater is not high, enhanced removal is not needed, in order to reduce chemical and power consumption and save operating cost, a unit of the rapid filtration of sediment in the suspended solids is started; the unit of the present invention can focus on automatic filtration of suspended solids and online backwashing.

a. Filtration method: The wastewater flows from a top to a bottom, flows through a filter material, and is filtered layers after layers. Suspended matter is filtered and trapped in a surface layer, an upper layer or a middle layer, and is filtered out flowed from a bottom of water b. Filter material selection: In the present invention, gravel and river sand are generally selected as filter materials, and a diameter of the filter material is generally 0.5 to 4 cm. The filter materials with different particle size are distributed in different filter layer, so as to achieve a purpose of filtering layer by layer. Generally from top to bottom, the particle size gradually becomes smaller. In a surface layer, the particle size is 2-4 cm; in the middle and upper layer, the particle size is 1-2 cm, and in the lower layer, the particle size is 0.5-1 cm.

c. Online backwashing: The system runs for 1 month, that is, online backwashing is started. The bottom of the filter tank is covered with perforated water pipes, a diameter of a hole is 0.5-1 cm, and a spacing is 20-50 cm. While backwashing, the wastewater is stopped, and clean water is sprayed from a bottom, in such a manner that the filter material is backwashed, and washed suspended matter is drained from the top overflow, and the surface cleanliness of the filter material is restored and then the online backwashing is restarted.

(3) PH adjustment: For the selectivity of microorganisms to PH in the bio-micelle micelles, the bioactivity of the wastewater is strong in the interval of pH 8-10, and pretreatment of the alkalinity adjustment of the wastewater is carried out. The alkalinity adjusting agent used in the present invention is lime slag, calcium carbonate slag and coal ash slag, and the pH value of the wastewater is adjusted to 7.5-10.5 before entering the bio-filter system. The wastewater stays in the pH adjustment unit for 8-16 h, and the alkalinity adjuster is replaced once in every 2 months.

(4) Hydrolysis acidification: After the pH value is adjusted, the wastewater enters a water distribution unit, and the two units are communicated. The biological membrane packing is arranged in the water distribution unit for the purpose of strengthening the anaerobic hydrolysis acidification of the wastewater and reducing a load of a subsequent unit. The hanging film filler selected by the present invention comprises: a combined PVC filler, soft filler, a spherical filler, an elastic filler and a filamentous filler; a placement manner comprises: fixed suspension and floating; wherein the suspension adopts channel steel, angle steel or rebar welding, or pre-embedded anchor rod, expansion screw or wire.

(5) Bio-filter treatment: The key process unit of the present invention realizes direct deep treatment of wastewater by the strong organic matter degradation ability and nitrogen removal ability of the microbial bacteria micelle. The height of the wall of the biological filter bed is generally 2.0-3.5 m, which is classified into 2-4 grades. If the COD concentration exceeds 3000 mg/l, anaerobic pretreatment, chemical strong oxidation, and electrochemical strong oxidation are generally adopted to reduce the COD concentration.

The bio-filter of the invention is generally divided into 5-10 layers from top to bottom, and preferably 6-8 layers. The main functional areas comprise water distribution layer, gas distribution layer, gas-water backwashing layer, water collecting layer and blind drain sewage layer.

(5-1) The height of the bio-filter is at a range of 2.0-3.5 meters, generally preferred 2.5-3.2 meters, 0.2 meter higher than the height of the bio-filter, the most preferred is 2.8-3.0 meters, which is 0.2 meter higher than the height of the bio-filter.

(5-2) The top water distribution layer, overhead layout, horizontal arrangement, with a longitudinal spacing of 1-2 m, and openings with lateral spacing at a range of 1-2 m, inner wire joint is installed with an atomizing nozzle, wherein a nozzle pressure is at a range of 0.2-0.5 kg, generally preferred 0.3-0.4 kg. The overall layout is in a grid shape, multi-point atomized water distribution, to ensure the uniformity of water distribution.

(5-3) Secondary water distribution layer, 15-25 cm from the top of the bio-filter, a diameter of a water distribution pipe of the secondary water distribution layer is ½ of a diameter of a water distribution pipe of the top water distribution layer; a perforated water distributor with an aperture of Φ6-10 mm, a spacing of 0.5-1 m. The main water distribution layer and the secondary water distribution layer control flow and a switch with a ball valve. When the top is decontaminated, nutrient replenishment influent can be achieved through the secondary water distribution layer to ensure survival of microorganisms inside the bio-filter. When water is distributed normally, it is also possible to achieve a carbon source replenishment effect in a higher concentration of wastewater to promote denitrification.

(5-4) Intermittent water distribution layer, 1.0-1.5 m from the top of the bio-filter, the pipe diameter is ½ of the top water distribution pipe, wherein the perforated water pipe has a hole diameter at a range of Φ6-10 mm, and a spacing at a range of 0.5-1 m, and the flow rate and switch are controlled by a ball valve with the main cloth layer.

(5-5) Gas-water backwashing layer, with a total of 5 layers, 0.1 m in height for each layer, wherein backwashing water pipe and backwashing gas pipe are in staggered arrangement in the gas-water backwashing layer, coarse sand is applied between upper and lower layers as a compartment; while cleaning empty bio-filter, keep 8-12 cycles per day, and 2-3 h for each cycle, wash with high pressure compressed air for 20-40 min, a flushing pressure is 1-2 kg, and an aging bio-film on a filler surface is cut by air shearing force to realize renewal of the bio-film and replace porosity. After 10 minutes' delay of air washing, wash with water by 8-12 cycles per day and for 2-3 h per cycle, rinse for 20-40 min, wherein a rinse pressure is at a range of 0.05-0.1 kg. The gas-water combined washing, air washing and water washing are carried out for 8-12 cycles to a last cycle, and the gas and water are flushed synchronously for 1-2 h. Finally, keep the bio-filter empty for 12-24 h, and after the washing water is drained, an original water inflow process is gradually restored.

(5-6) Bottom water collecting layer, plastic blind ditch, perforated PVC water pipe, perforated PE water pipe are adopted, and branches are arranged with a hole spacing of 0.2-0.6 m and a hole diameter of 0.5-1.5 cm.

Due to the mechanism limitation of most microbial treatment systems, biological activity of microorganisms is greatly affected by temperature. When the outside temperature fluctuates significantly, the outside temperature drops sharply by 5-15° C., or the temperature continues to drop below 10° C., and the treatment effect of the sewage treatment system will deteriorate dramatically and even the entire system will collapse. The focus of the invention is to reduce the heat transfer efficiency of the filler through the external heating source of the ventilation system, and the structural insulation of the bio-filter ensures that the internal temperature of the filter bed is maintained above 5-10° C.

(5-A) External heating source: By connecting the fan outlet pipe through the heating system, the wind is heated, and hot air is introduced into the bio-filter. The heating system comprises thermal insulation aluminum, insulation cotton, steel pipe, heating pipe, and temperature control system.

a. Insulation aluminum skin: generally choose a thickness at a range of 0.5-0.7 mm.

b. Insulation cotton: generally choose mineral wool, rock wool, glass wool, rubber, polystyrene or polyurethane.

c. Steel pipe: galvanized steel pipe;

d. Heating pipe: adopting a combined heating by far infrared radiation heating tube and PTC ceramic heating element, with a single group power of 1.0-1.5 kw, and 2-4 groups in total.

e. Temperature control adjustment: comprising a temperature sensor, the signal is transmitted to the PLC according to the temperature condition, control the start and stop of the heating tube, 5-10° C., a group is turned on; 0-5° C., two groups are turned on, ° C., three groups are turned on; which are increased insequence.

(5-B) Filler heat transfer efficiency attenuation

According to the different heat transfer efficiency of the medium, the filler form of the biological filter bed is changed. The main medium inside the conventional filter bed is water. The present invention uses loose organic matter as an internal medium, which greatly reduces the heat transfer and effectively reduces the heat loss.

(5-C) Wall of the bio-filter insulation

By adding an effective heat source, in order to ensure that the heat is not dissipated, the present invention physically heats the interior of the wall of the bio-filter. Insulation material selects mineral wool, polystyrene foam board or polystyrene pellet insulation slurry.

(6) Intermediate water temporary storage unit: The bio-filter is in an intermittent operation. The intermediate production water needs to be temporarily stored, then, after a certain amount of water is accumulated, a next-stage filter bed is entered. The storage time is generally 6-12 h. Meanwhile, the intermediate storage water can also be adopted as backwashing water. The backwashing line and the lower stage filter bed inlet line are functionally switched through the valve, and the same pump supplies water thereto.

(7) Water quality enhancement unit: After the wastewater is treated by the bio-filter, the removal rate of COD and ammonia nitrogen main pollutants can reach more than 90%, and an up-to standard discharge is basically achieved. The present invention focuses on reducing the energy consumption of the front-stage bio-filter, and meanwhile solves the common problem of high-concentration organic wastewater treatment, that is, the problem of insufficient carbon source in the denitrification stage, the accumulation of nitrate and nitrite. The unit generally adopts horizontal submerged artificial wetland, vertical flow artificial wetland, surface flow artificial wetland, upward flow filter and down-flow filter. The present invention focuses on compatibility of the above different process unit fillers with an external carbon source to achieve the purpose of salt and nitrite denitrification and reduction of nitric acid.

Compatibility:

a. Filler selection: generally choose gravel with a diameter at a range of 0.5-4 cm, medium coarse sand b. Carbon source selection: chaff, straw, sawdust, starch ash, glucose, methanol, wherein chaff, straw and sawdust are preferred.

What is claimed is:

1. A method for directly purifying organic wastewater, comprising steps of:
   (1) fortified precipitation treatment: sending the organic wastewater to an enhanced precipitation unit for pretreatment, wherein the enhanced precipitation unit comprises a dosing and coagulation unit, a dosing and flocculation unit and a physical precipitation unit;
   (2) filtration of sediment of suspended solids: passing the organic wastewater treated by the enhanced precipitation unit through a filtration unit for the sediment of the suspended solids, wherein a filter material of the filtration unit for the sediment of the suspended solids is selected from the group of gravel, river sand, and combinations thereof, and particle size distribution of a filter bed comprises: 2-4 cm of a surface layer, 1-2 cm of a middle and upper layer, and 0.5-1 cm of a lower layer;
   (3) pH adjustment: performing alkalinity adjusting pretreatment on the organic wastewater after the filtration of the sediment of the suspended solids in the step (2) and adjusting a pH value of the organic wastewater to a range of 7.5-10.5;
   (4) hydrolysis acidification: introducing the organic wastewater after adjusting the pH value into a water distribution unit, and a biological membrane packing is provided in the water distribution unit to strengthen anaerobic hydrolysis acidification effects of the organic wastewater;
   (5) treatment of a bio-filter: distributing the organic wastewater into a bio-filter unit by the water distribution unit, so as to achieve direct treatment of the organic wastewater by organic matter degradation ability of biological filler;
   wherein when a concentration of the suspended solids in the organic wastewater does not need removal, the step (1) of fortified precipitation treatment is omitted, and the organic wastewater is directly performed with the step (2) of the filtration of the sediment of the suspended solids;
   wherein a temperature adjustment control system is provided on the bio-filter, the temperature adjustment control system comprises a heating system, an insulated filter wall, and a temperature sensing control system, wherein the heating system is connected with a fan outlet pipe, and after heating air, a hot air is introduced into the bio-filter; wherein the heating system comprises an insulated aluminum shell, heat insulating cotton, a steel pipe and heating pipes from an external side to an internal side; the heating pipes are far infrared radiation heating lamps and/or a PTC ceramic heating elements.

2. The method for directly purifying organic wastewater, as recited in claim 1, wherein the temperature sensing control system comprises a temperature sensor, the temperature sensor is configured to transmit a signal to a PLC, the PLC is configured to control opening and stopping of the heating pipes according to temperature conditions, including when a temperature is at 5-10° C., opening one group of the heating pipes; when the temperature is at 0-5° C., opening two groups of the heating pipes; when the temperature is at −5-0° C., opening three groups of the heating pipes.

3. A method for directly purifying organic wastewater, comprising steps of:
   (1) fortified precipitation treatment: sending the organic wastewater to an enhanced precipitation unit for pretreatment, wherein the enhanced precipitation unit comprises a dosing and coagulation unit, a dosing and flocculation unit and a physical precipitation unit;
   (2) filtration of sediment of suspended solids: passing the organic wastewater treated by the enhanced precipitation unit through a filtration unit for the sediment of the suspended solids, wherein a filter material of the filtration unit for the sediment of the suspended solids is selected from the group of gravel, river sand, and combinations thereof, and particle size distribution of a filter bed comprises: 2-4 cm of a surface layer, 1-2 cm of a middle and upper layer, and 0.5-1 cm of a lower layer;
   (3) pH adjustment: performing alkalinity adjusting pretreatment on the organic wastewater after the filtration of the sediment of the suspended solids in the step (2) and adjusting a pH value of the organic wastewater to a range of 7.5-10.5;
   (4) hydrolysis acidification: introducing the organic wastewater after adjusting the pH value into a water distribution unit, and a biological membrane packing is provided in the water distribution unit to strengthen anaerobic hydrolysis acidification effects of the organic wastewater;
   (5) treatment of a bio-filter: distributing the organic wastewater into a bio-filter unit by the water distribution unit, so as to achieve direct treatment of the organic wastewater by organic matter degradation ability of biological filler;
   wherein in the step (5), a height of the bio-filter adopted in the step (5) is at a range of 2.0 to 3.5 meters, and is divided into 5 to 10 layers from top to bottom, comprising: a top water distribution layer, a secondary water distribution layer, and an intermittent water distribution layer, a gas-water backwashing layer, a bottom water collecting layer, and a blind drain sewage layer; a top cloth water layer is provided overheadly with an atomizing water distributor, and an atomizing nozzle is provided on the atomizing water distributor; a distance between the secondary water distribution layer and a top of the bio-filter is at a range of 15-25 cm; and a diameter of a water distribution pipe of the secondary water distribution layer is ½ of a diameter of a water distribution pipe of the top water distribution layer; the gas-water backwashing layer comprises 5 layers, wherein each layer of the 5 layers is 0.1 m; and backwashing water pipes and backwashing gas pipes are staggered inside the gas-water backwashing layer; sand is provided between each adjacent layer of the 5 layers for serving as partition layers; the bottom water collecting layer is made of plastic blind ditch, perforated PVC water pipe or perforated PE water pipe, which are provided in a branch shape.

4. The method for directly purifying organic wastewater, as recited in claim 3, wherein the gas-water backwashing layer adopts a flushing mode of 8-12 cycles per day, each of the cycles is 2-3 hours, compressed air is washed for 20-40 min, a flushing pressure is 1000-2000 grams, and air washing is delayed for 10 minutes, and then is washed by water for 8-12 cycles per day, 2-3 hours per cycle, and is rinsed for 20-40 min, wherein a rinse pressure is at a range of 50-100 grams.

5. A method for directly purifying organic wastewater, comprising steps of:
(1) fortified precipitation treatment: sending the organic wastewater to an enhanced precipitation unit for pretreatment, wherein the enhanced precipitation unit comprises a dosing and coagulation unit, a dosing and flocculation unit and a physical precipitation unit;
(2) filtration of sediment of suspended solids: passing the organic wastewater treated by the enhanced precipitation unit through a filtration unit for the sediment of the suspended solids, wherein a filter material of the filtration unit for the sediment of the suspended solids is selected from gravel, river sand, and combinations thereof, and particle size distribution of a filter bed comprises: 2-4 cm of a surface layer, 1-2 cm of a middle and upper layer, and 0.5-1 cm of a lower layer;
(3) pH adjustment: performing alkalinity adjusting pretreatment on the organic wastewater after the filtration of the sediment of the suspended solids in the step (2) and adjusting a pH value of the organic wastewater to a range of 7.5-10.5;
(4) hydrolysis acidification: introducing the organic wastewater after adjusting the pH value into a water distribution unit, and a biological membrane packing is provided in the water distribution unit to strengthen anaerobic hydrolysis acidification effects of the organic wastewater;
(5) treatment of a bio-filter: distributing the organic wastewater into a bio-filter unit by the water distribution unit, so as to achieve directly treatment of the organic wastewater by organic matter degradation ability of biological filler;
wherein a coagulant adopted in the dosing and coagulation unit in the step (1) comprises: polyaluminum chloride or polyferric ferrous sulfate; a flocculating agent adopted in the dosing and flocculation unit comprises cationic polyacrylamide, anionic polyacrylamide or nonionic polyacrylamide;
wherein the dosing and flocculation unit specifically adopts a mechanical flocculation tank, a first flocculation time is at a range of 20-30 min, and a flow velocity of the mechanical flocculation tank is designed according to a gradient from large to small, and a starting flow velocity is at a range of 0.5-0.6 m/s, and an end flow velocity is at a range of 0.2-0.3 m/s, and a clearance between partitions is greater than 0.5-1 m.

6. The method for directly purifying organic wastewater, as recited in claim 5, wherein the dosing and flocculation unit specifically adopts the mechanical flocculation tank, and the first flocculation time is generally selected from 15 to 20 min; the mechanical flocculation tank is provided with a 3 to 4 gear mixer; a line speed of the mixer gradually decreases from 0.5 m/s in a first gear to 0.2 m/s in a last gear; and facilities for preventing plug flow in water are provided in the mechanical flocculation tank.

7. The method for directly purifying organic wastewater, as recited in claim 5, wherein a granulating and flocculation unit adopts a folding plate flocculation tank, and a second flocculation time is at a range of 12-20 min; a speed in a flocculation process is divided into 3-8 sections, and a flow velocity of each section is: 0.25-0.35 m/s in a first section, 0.15-0.25 m/s in a second section, 0.10-0.15 m/s in a third section, and an angle of a folded plate is at a range of 90°-120°.

8. The method for directly purifying organic wastewater, as recited in claim 5, wherein a granule and flocculation unit specifically adopts a grid flocculation tank, wherein the grid flocculation tank is a multi-grid vertical flow flocculation tank, and the grid flocculation tank is arranged in two or more groups in a parallel form, and a mud discharging facility in provided in the grid flocculation tank; a third flocculation time is at a range of 12-20 min; a flow velocity of a vertical shaft, the over-gate flow velocity and a hole passing flow velocity of the grid flocculation tank are divided into three sections, which are decremented step by step, respectively comprising: the flow velocity of the vertical shaft of 0.14-0.12 m/s in a front section and a middle section, and 0.14-0.10 m/s in a last section; over-gate flow velocity of 0.30-0.25 m/s in the front section, 0.25-0.22 m/s in the middle section, and 0.22-0.100 m/s in the last section; the flow velocity of the vertical shaft of 0.30-0.20 m/s in the front section, 0.20-0.15 m/s in the middle section 0.14-0.10 m/s in the last section.

9. The method for directly purifying organic wastewater, as recited in claim 1, wherein after being treated by the bio-filter, an intermediate water temporary storage unit and a water quality strengthening unit are further provided; wherein the water quality strengthening unit is at least one member selected from a group consisting of a horizontal submerged artificial wetland, a vertical flow artificial wetland, a surface flow artificial wetland, an upward flow filter and a downward flow filter; the water quality strengthening unit has a filler of gravel or medium coarse sand with a diameter at a range of 0.5-4 cm; a carbon source of the water quality strengthening unit is at least a member selected from the group consisting of chaff, straw end, sawdust, starch ash, glucose and methanol.

* * * * *